United States Patent [19]

Blank

[11] 4,374,164

[45] Feb. 15, 1983

[54] HIGH SOLIDS POLYMER RESIN COATING COMPOSITION CONTAINING AMINO RESIN CROSS-LINKING AGENT

[75] Inventor: Werner J. Blank, Wilton, Conn.

[73] Assignee: American Cyanamid Company, Stamford, Conn.

[21] Appl. No.: 330,422

[22] Filed: Dec. 14, 1981

[51] Int. Cl.$^3$ ................................................ B05D 3/02
[52] U.S. Cl. .............................. 427/385.5; 427/388.3; 427/410; 525/157; 525/162
[58] Field of Search ............... 427/388.1, 388.2, 388.3, 427/407.1, 409, 410, 379, 385.5, 386; 525/418, 437, 157, 162

[56] References Cited

U.S. PATENT DOCUMENTS

| | | | |
|---|---|---|---|
| 4,053,682 | 10/1977 | Donermeyer | 427/409 X |
| 4,082,894 | 4/1978 | Yoshida | 427/164 X |
| 4,190,699 | 2/1980 | Kanazawa et al. | 428/412 |
| 4,217,377 | 8/1980 | Shay et al. | 427/195 |
| 4,242,412 | 12/1980 | Funaki et al. | 427/165 X |
| 4,242,413 | 12/1980 | Iwahashi et al. | 427/164 X |
| 4,243,705 | 1/1981 | Yapp et al. | 427/388.3 X |

Primary Examiner—Michael R. Lusignan
Assistant Examiner—Thurman K. Page
Attorney, Agent, or Firm—Steven J. Hultquist

[57] ABSTRACT

A high solids polymer resin coating composition cross-linked with alkylated melamine resins possessing improved intercoat adhesion in multiple coating applications. A mixed methylated isobutylated melamine resin as a cross-linking agent for the high solids polymer resin coating composition surprisingly substantially eliminates intercoat adhesion failure without any negative effects on overall coating properties and performance. The backbone polymer of the composition may advantageously be acrylic resin, a polyester resin or mixtures thereof while the mixed methylated isobutylated melamine resin cross-linking agent is advantageously predominantly monomeric poly(methoxy isobutoxymethyl) melamine resin with an average methoxy content of 1-5 and an average isobutoxy content of 5-1, per triazine.

13 Claims, No Drawings

HIGH SOLIDS POLYMER RESIN COATING COMPOSITION CONTAINING AMINO RESIN CROSS-LINKING AGENT

BACKGROUND OF THE INVENTION

This invention relates to high solids polymer resin coating compositions containing cross-linking agents and, particularly, to such compositions containing alkylated melamine formaldehyde resin cross-linking agents.

High solids polymer resin coating compositions cross-linked with alkylated melamine formaldehyde resins are finding increasing use for general industrial and appliance applications and as automotive top finishes. Such coating compositions, compared to lower solids coatings, often reduce solvent emission and are more acceptable from an environmental standpoint. In order to achieve higher application solids, lower molecular weight backbone polymers and cross-linking agents are used. In industrial applications where coatings are cured by baking, monomeric hexa(methoxymethyl) melamine resins have achieved widespread acceptance as cross-linking agents.

While it has been found that the higher cross-link density achieved with the chemically efficient hexa(methoxymethyl) melamine resin results in highly resistant films and finishes, it has also been observed that recoating of a baked coating with the same coating system is very difficult. That is, without any sanding, etching or other treatment of the already coated part, no effective intercoat adhesion is achieved. Yet, sanding or etching of the coated part prior to recoating is an expensive and time consuming task. On complicated parts, it is difficult to achieve uniformity with such treatments.

Nevertheless, in many coating operations, recoating is necessary for various reasons. For example, coated parts may be damaged during assembly or multiple coatings, as in the case of two-tone colors on an automobile, may be desired. In a multiple coating operation such as two-tone painting of an automobile, the automobile is first coated with one color which is subsequently baked, the area not to be painted with the second color is masked and then the second color is applied on the remaining uncovered areas of the automobile and cured. Although some high solids coating compositions cross-linked with hexa(methoxymethyl) melamine can function satisfactory in such a recoat operation under controlled laboratory baked conditions, in actual operations they often fail because of decreased control of the curing cycle. It has been found that baking of the first coat at higher temperature or longer time periods during production than should normally occur reduces intercoat adhesion of the second coat.

Thus, it is desirable to have a highly cross-linked coating composition of high solids content which possesses the advantages achieved with hexa(methoxymethyl) melamine as a cross-linking agent but which does not suffer from the disadvantages associated with such a composition such as poor intercoat adhesion. Although mixed methylated n-butylated melamine formaldehyde resin cross-linking agents have improved intercoated adhesion between two coats compared to hexa(methoxymethyl) melamine cross-linked systems in some instances, in many applications the improvement remains insufficient.

SUMMARY OF THE INVENTION

The advantages of hexa(methoxymethyl) melamine resin and methylated n-butylated melamine resin, such as hexa(methoxy-n-butoxymethyl) melamine resin as cross-linking agents for high solids polymer resin coating compositions, such as cure response, hardness, solvent resistance and humidity resistance, can be obtained with the further advantage of superior intercoat adhesion.

Such is achieved, according to this invention, through the provision of a mixed methylated isobutylated melamine resin as a cross-linking agent for high solids polymer resin coating compositions which surprisingly substantially eliminates intercoat adhesion failure without any negative effects on overall coating properties and performance. This elimination of poor intercoat adhesion is truly unexpected for one would normally expect only minor or no differences in properties and performance of a methylated n-butylated melamine resin and a methylated isobutylated melamine resin of similar structure with the difference being essentially in the substitution of an isobutyl group for the n-butyl group.

An object of this invention is the provision of a high solids polymer resin coating composition cross-linked with alkylated melamine resins having improved intercoat adhesion in multiple coating applications.

A further object of this invention is the provision of a high solids polymer resin coating composition containing a mixed, methylated isobutylated melamine resin as a cross-linking agent.

A yet further object of this invention is the provision of a coating produced by a high solids polymer resin coating composition containing a mixed methylated isobutylated melamine resin as a cross-linking agent.

The backbone polymer of the composition may advantageously be acrylic resin, a polyester resin or mixtures thereof while the mixed methylated isobutylated melamine resin cross-linking agent is advantageously predominantly monomeric poly(methoxy isobutoxymethyl) melamine resin with an average methoxy content of 1-5 and an average isobutoxy content of 5-1, per triazine.

The foregoing and other objects, features and advantages of this invention will be further apparent from the following description of preferred embodiments thereof.

DESCRIPTION OF THE PREFERRED EMBODIMENTS

The invention can be best understood by reference to the following examples.

EXAMPLE 1

A high solids acrylic polymer comprising butylacrylate/methylmethacrylate and hydroxyethylacrylate and having a hydroxyl number of about 150 and an average molecular weight of about 5000 is cross-linked with several melamine cross-linking agents. The weight ratio of acrylic polymer to melamine resin used is 65:35. The diisopropanolamine salt of p-toluene sulfonic acid is used as catalyst with 0.24 percent toluene sulfonic acid and 0.2 percent diisopropanolamine, based on resin content.

The melamine cross-linking agents chosen included a commercial grade of hexa(methoxymethyl) melamine resin (designated HMMM) with an average molar ratio of combined melamine/formaldehyde/methanol of 1/5.9/5.2. The less than theoretical level of 6 mols formaldehyde and 6 mols methanol in HMMM indicates the presence of some dimer, trimer and higher oligomer. A commercial grade of hexa(methoxy-n-butoxymethyl) melamine resin (designated HMBMM) with an average butoxy content of about 2.5 per triazine, as determined by NMR analysis, with the remainder of the alkoxy groups being methoxy, was also used. A hexa(methoxisobutoxymethyl) melamine (designated HMiBMM) resin of similar composition to the HMBMM but with the n-butoxy groups replaced by isobutoxy groups was also used.

The above formulations are drawn down on iron phosphated steel panels primed with an commercial automotive epoxy ester primer having a film thickness of approximately 18 μm as a substrate. The dry film thickness of the clear acrylic basecoat is 45–50 mm. After baking of this coating at 150° C. for 30 minutes, the panel is recoated with the same formulation and baked 30 minutes at 121° C. The cure cycle of 150° C. for the first coat and 121° C. for the second coat was selected as a very severe test cycle which, in the laboratory, simulates the conditions encountered in a plant. Knoop hardness and solvent resistance, to methylethyl ketone, of the basecoat was measured. A cross batch adhesion test, substantially in accordance with the procedure of ASTM D3359, was carried out to determine the adhesion between the basecoat and topcoat. The results are set forth in Table 1.

TABLE 1

| Cross-Linking Agent | Knoop Hardness | MEK Resistance | Intercoat Adhesion |
|---|---|---|---|
| HMMM | 12.6 | 200 | 0 |
| HMBMM | 10.5 | 200 | 0–1 |
| HMiBMM | 11.0 | 200 | 4 |

As seen in Table 1, the coating properties, such as hardness and solvent resistance, are essentially the same for all the cross-linking agents. However, the cross batch adhesion tests shows a complete loss of adhesion between the first and second coat for the HMMM and the HMBMM cross-linking system and excellent adhesion of the HMiBMM system. An increase in the baking temperature to 175° C. for the first coat was found to decrease the intercoat adhesion of the HMiBMM cross-linked system only slightly.

EXAMPLE 2

A high solids acrylic resin with a composition of butylacrylate/styrene/hydroxyethylacrylate/acrylic acid in the respective weight ratio of 40:40:16:4 and having an average molecular weight of 5500 and a viscosity of 7000 mPa at a 75 percent non-volatile in a solvent is typical for general industrial and appliance applications. This resin is cross-linked with HMMM, HMBMM and HMiBMM as described in Example 1. The coating steps are as described above in Example 1 with the same measurements being made. The results are set forth in Table 2.

TABLE 2

| Cross-Linking Agent | Knoop Hardness | MEK Resistance | Intercoat Adhesion |
|---|---|---|---|
| HMMM | 12.1 | >200 | 0 |
| HMBMM | 8.3 | >200 | 1 |
| HMiBMM | 9.3 | >200 | 5 |

As seen in Table 2, the hardness and solvent resistance are essentially the same for all three compositions. However, while the intercoat adhesion is poor or non-existent for the HMMM and HMBMM cross-linked system it is excellent for the HMiBMM cross-linked system.

The coating composition of this invention may include, as the backbone polymer, low molecular weight acrylic or polyester resin or mixtures thereof with an average molecular weight advantageously between 10,000 and 1,000 and preferably between 8,000 and 2,000. Such acrylic and/or polyester resins advantageously have a hydroxyl number between 30 to 250 and preferably in the range between 70 to 200. Optionally, the resin can contain carboxyl groups, advantageously with acid numbers 0 to 50 and preferably from between 5 to 30, or also amide functionality.

The acrylic resins may be prepared by conventional radical polymerization process. Initiator and chain transfer agents are selected to assure a low molecular weight. Typical acrylic or vinyl monomers useful herein are the $C_1$ to $C_8$ alkyl ester of acrylic and methacrylic acid, styrene, and acrylonitrile. The hydroxy functionality in these polymers is derived from hydroxy ethyl, hydroxy propyl acrylate or methacrylate or other hydroxyalkylacrylates or by reaction of a carboxyl functional acrylic resin with an epoxied such as ethylene oxide, propylene oxide or other olefin oxides. The carboxy functionality on these resins can be derived from acrylic, methacrylic, maleic or fumaric acid half ester.

Typical polyester resins useful herein are the condensation reaction products of a diol, triol and a dibasic and tribasic carboxylic acid. Examples of suitable diols and triols are ethylene glycol, propylene glycol (1.2 and 1.3) 1.3 butylene glycol; neopentylglycol, cyclohexanedimethanol, trimethyl pentane diol, trimethylolpropane, trimethylolethane, glycerine and the like. Examples of dibasic and tribasic acids useful in these polyesters are: succinic acid, gluteric acid, adipic acid, sabacic acid, o and m phthalic acid and terephthalic acid and trimellitic anhydride.

Thus, it can be seen that most commercially available are high solids acrylic and polyester resins can be advantageously used in this invention.

The cross-linking agent resin of the coating composition of this invention is advantageously a predominately monomeric poly(methoxy isobutoxymethyl) melamine resin having an average methoxy content of 1–5 and an average isobutoxy content from 5 to 1, per triazine. The preferred methoxy to isobutoxy ratio is between 2/1 to 1/2.

It is understood that amino resin with an average combined composition of 2.5 methoxy and 2.5 isobutoxy groups per triazine contains a statistical distribution of isobutoxy/methoxy groups per triazine. Some molecules might contain mono isobutoxy tetra methoxy substitution, others diisobutoxy trimethoxy, or other groups. The sum of all molecules with different substitution will result in the average substitution of 2.5 methoxy and 2.5 isobutoxy. Pure amino compounds of this invention are completely monomeric and have hexa alkoxy substitution. The commercial products contain less than the theoretical hexa substitution because of some polymer content and also residual NH and methylol groups on the melamine compound.

The preferred melamine cross-linking agents have a degree of polymerization (DP) of below 3 and a monomer content of >40% weight percent.

The weight ratio of high solids backbone polymer to amino resin can advantageously be between 85/15 to 50/50 with a preferred range of between 75/25 to 60/40.

High solids coating systems of this invention require an acid catalyst for cure such as a sulfonic acid. Typical examples are p-toluene sulfonic acid, n-dodecyl benzene sulfonic acid and alkyl naphthalene sulfonic acids. To achieve stability during storage these acid catalysts can be blocked with an organic amine or ammonia. Solvents useful are the typical organic solvent used in coatings such as toluene, xylene, n-butanol, esters glycol ethers and ketones. The system can also be pigmented with inorganic or organic pigments or metal flakes.

What is claimed is:

1. A high solids polymer resin coating composition possessing improved intercoat adhesion comprising a low molecular weight resin selected from the group consisting of acrylic resin, polyester resin and mixtures thereof and a predominantly monomeric poly(methoxy isobutoxy methyl) melamine resin cross-linking agent.

2. A high solids polymer resin coating composition as claimed in claim 1 wherein the melamine resin cross-linking agent has an average methoxy content of 1-5 and an average isobutoxy content of 5-1, per triazine.

3. A high solids polymer resin coating composition as claimed in claim 2 wherein the methoxy to isobutoxy ratio of the melamine resin cross-linking agent is between 2:1 to 1:2.

4. A high solids polymer resin coating composition as claimed in claims 1, 2 or 3 wherein the low molecular weight resin is one having an average molecular weight between 10,000 and 1,000 and a hydroxyl number between 30 to 250.

5. A high solids polymer resin coating composition as claimed in claim 4 wherein the weight ratio of low molecular weight resin to cross-linking agent is in the range 85:15 to 50:50.

6. A high solids polymer resin coating composition as claimed in claim 4 wherein the weight ratio of low molecular weight resin to cross-linking agent is in the range 75:25 to 60:40.

7. A high solids polymer resin coating composition comprising a backbone polymer selected from the group consisting of acrylic resin, polyester resin and mixtures thereof and an alkylated melamine formaldehyde resin as a cross-linking agent, the improvement therein providing a coating composition possessing improved intercoat adhesion between two coats comprising selecting a mixed methylated isobutylated melamine formaldehyde resin as the cross-linking agent.

8. A high solids polymer resin coating composition comprising a polymer selected from the group consisting of acrylic resin, polyester resin or mixtures thereof, having an average molecular weight between 8,000 and 2,000 and a hydroxyl number between 70 to 200 and a predominantly monomeric poly(methoxy isobutoxymethyl) melamine resin with an average substitution of 2.5 methoxy and 2.5 isobutoxy groups per triazine, a degree of polymerization below 3 and a monomeric content greater than 40 weight percent, the weight ratio of high solids polymer to melamine resin ranging between 75:25 to 60:40.

9. A coating composition as claimed in claim 8 wherein the acrylic resin is one formed from the monomer selected from the group consisting of a $C_1$ to $C_8$ alkyl ester of acrylic and methacrylic acid, styrene and acrylonitrile and mixtures thereof, and the polyester resin is one selected from the condensation reaction products of those compounds selected from the group consisting of diol, triol and dibasic and tribasic carboxylic acid.

10. A high solids polymer resin coating composition as claimed in claims 8 or 9 wherein the melamine resin is hexa(methoxy-isobutoxymethyl) melamine resin having an average butoxy content of about 2.5 per triazine.

11. A high solids polymer resin coating composition as claimed in claim 9 wherein the acrylic resin comprises a mixture of butylacrylate/methylmethacrylate and hydroxyethylacrylate having a hydroxyl number of about 150 and an average molecular weight of about 5000 and the weight ratio of acrylic resins to melamine resin is 65:35.

12. A high solids polymer resin coating composition as claimed in claim 9 wherein the acrylic resin comprises a mixture of butyl-acrylate/styrene/hydroxyethylacrylate/acrylic acid in the respective weight ratio of 40:40:16:4 and having an average molecular weight of 5500 and a viscosity, at a 75 percent non-volatile in a solvent, of 7000 Pa, and the weight ratio of acrylic resin to melamine resin is 65:35.

13. A process of coating a substrate by application of a high solids polymer resin coating composition, curing of the composition and recoating with the same high solids polymer resin coating composition, the improvement providing a coating of improved intercoat adhesion therein wherein the coating composition is one as claimed in claims 1, 2, 3, 7, 8, 9, 11 or 12.

* * * * *